United States Patent
Tanaka

(10) Patent No.: US 10,306,196 B2
(45) Date of Patent: May 28, 2019

(54) PIXEL MIXING DEVICE AND METHOD FOR CONTROLLING OPERATION OF SAME

(71) Applicant: FUJIFILM Corporation, Tokyo (JP)

(72) Inventor: Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 27 days.

(21) Appl. No.: 14/947,738

(22) Filed: Nov. 20, 2015

(65) Prior Publication Data
US 2016/0080713 A1   Mar. 17, 2016

Related U.S. Application Data

(63) Continuation of application No. PCT/JP2014/062944, filed on May 15, 2014.

(30) Foreign Application Priority Data

May 23, 2013 (JP) .................................. 2013-108578

(51) Int. Cl.
   *H04N 5/64* (2006.01)
   *H04N 5/04* (2006.01)
   (Continued)

(52) U.S. Cl.
   CPC .......... *H04N 9/646* (2013.01); *G06T 3/4015* (2013.01); *H04N 5/347* (2013.01); *H04N 9/045* (2013.01);
   (Continued)

(58) Field of Classification Search
   None
   See application file for complete search history.

(56) References Cited

U.S. PATENT DOCUMENTS

| | | | |
|---|---|---|---|
| 7,756,361 B2 * | 7/2010 | Hong | ...................... G06T 3/403 |
| | | | 382/300 |
| 2003/0193600 A1 * | 10/2003 | Kitamura | ........... H04N 5/23212 |
| | | | 348/333.01 |

(Continued)

FOREIGN PATENT DOCUMENTS

| | | |
|---|---|---|
| CN | 102151117 A | 8/2011 |
| CN | 102213893 A | 10/2011 |

(Continued)

OTHER PUBLICATIONS

Chinese Office Action and Search Report, dated Sep. 1, 2016, for Chinese Application No. 201480029577.3, with English Translation of the Chinese Office Action.

(Continued)

*Primary Examiner* — Mark T Monk
(74) *Attorney, Agent, or Firm* — Birch, Stewart, Kolasch & Birch, LLP

(57) ABSTRACT

It is determined whether an image before pixel mixture has a high frequency. In a partial image obtained by an imaging device having a Bayer array, a Gr pixel which indicates a green component and is arranged in the same row as an R pixel indicating a red component is distinguished from a Gb pixel which indicates a green component and is arranged in the same row as a B pixel indicating a blue component. The Gr pixels and the Gb pixels which are distinguished from each other are separately mixed. When an image before pixel mixture has a high-frequency component, the level of the Gr pixel and the level of the Gb pixel are different from each other after pixel mixture. It is determined whether the image before pixel mixture has a high-frequency component based on levels of the Gr pixel and Gb pixel after pixel mixture.

16 Claims, 21 Drawing Sheets

(51) Int. Cl.
*G06T 3/40* (2006.01)
*H04N 9/64* (2006.01)
*H04N 5/347* (2011.01)
*H04N 9/07* (2006.01)
*H04N 9/04* (2006.01)

(52) U.S. Cl.
CPC ......... *H04N 9/07* (2013.01); *H04N 2209/046* (2013.01)

(56) References Cited

U.S. PATENT DOCUMENTS

| | | |
|---|---|---|
| 2006/0244841 A1 | 11/2006 | Ikeda |
| 2008/0043115 A1 | 2/2008 | Tsukioka |
| 2008/0088725 A1 | 4/2008 | Matsunaga |
| 2008/0239121 A1* | 10/2008 | Egawa .................. H04N 5/367 348/294 |
| 2011/0080503 A1* | 4/2011 | Okada .................. H04N 5/345 348/234 |
| 2011/0184236 A1 | 7/2011 | Yoshino |
| 2011/0273599 A1 | 11/2011 | Murata |
| 2013/0293750 A1 | 11/2013 | Tanaka |

FOREIGN PATENT DOCUMENTS

| | | |
|---|---|---|
| JP | 2003-250091 A | 9/2003 |
| JP | 2004-356681 A | 12/2004 |
| JP | 2005-311962 A | 11/2005 |
| JP | 2005-328215 A | 11/2005 |
| JP | 2006-20037 A | 1/2006 |
| JP | 2006-261789 A | 9/2006 |
| JP | 2007-43364 A | 2/2007 |
| JP | 2008-98971 A | 4/2008 |
| JP | 2012-195677 A | 10/2012 |
| JP | 2013-21616 A | 1/2013 |
| WO | WO 2012/124184 A1 | 9/2012 |

OTHER PUBLICATIONS

International Preliminary Report on Patentability issued in PCT/JP2014/062944, dated Aug. 4, 2015.
International Search Report issued in PCT/JP2014/062944, dated Aug. 19, 2014.
Written Opinion of the International Searching Authority issued in PCT/JP2014/062944, dated Sep. 19, 2015.
Written Opinion of the International Searching Authority issued in PCT/JP2014/062944, dated Aug. 19, 2014.

* cited by examiner

PIXEL MIXING DEVICE AND METHOD FOR CONTROLLING OPERATION OF SAME

CROSS-REFERENCE TO RELATED APPLICATIONS

This application is a Continuation of PCT International Application No. PCT/JP2014/062944 filed on May 15, 2014, which claims priority under 35 U.S.C. § 119(a) to Japanese Patent Application No. 2013-108578 filed May 23, 2013. Each of the above application(s) is hereby expressly incorporated by reference, in its entirety, into the present application.

BACKGROUND OF THE INVENTION

1. Field of the Invention

The present invention relates to a pixel mixing device, a method for controlling an operation of the pixel mixing device, and a program for controlling the operation of the pixel mixing device.

2. Description of the Related Art

There is a technique which mixes pixels of the same color in order to generate a reduced image. For example, when pixel mixture is performed for color image data obtained by a solid-state electronic imaging device with a Bayer array, a pixel addition ratio is adjusted such that the centers of gravity of the added pixels are arranged at equal intervals (JP2008-98971A) or the amount of amplification before pixel addition is adjusted such that the centers of gravity of the added pixels are arranged at equal intervals (JP2006-261789A).

SUMMARY OF THE INVENTION

However, when the pixels of the same color are simply mixed with each other, it is difficult to check whether an image before pixel mixture has a high-frequency component. In the techniques disclosed in JP2008-98971A and JP2006-261789A, it is difficult to check whether an image before pixel mixture has a high-frequency component.

An object of the invention is to provide a technique which can check whether an image before pixel mixture has a high-frequency component even when pixel mixture is performed.

A pixel mixing device according to the invention includes: a same-color pixel extraction device (same-color pixel extraction means) for extracting pixels of the same color, which are included in a mixture block including a plurality of pixels, in different cycles in at least one of a column direction and a row direction, in an object image in which a large number of pixels are arranged in the column direction and the row direction; and a first same-color pixel mixture device (first same-color pixel mixture means) for mixing a plurality of pixels of the same color, which are extracted in different cycles by the same-color pixel extraction device, in each mixture block.

The invention also provides an operation control method suitable for the pixel mixing device. That is, this method includes: allowing a same-color pixel extraction device to extract pixels of the same color, which are included in a mixture block including a plurality of pixels, in different cycles in at least one of a column direction and a row direction, in an object image in which a large number of pixels are arranged in the column direction and the row direction; and allowing a same-color pixel mixture device to mix a plurality of pixels of the same color, which are extracted in different cycles by the same-color pixel extraction device, in each mixture block.

The invention also provides a recording medium storing a computer-readable program for performing a method for controlling an operation of a pixel mixing device.

According to the invention, in the object image, the pixels of the same color, which are included in the mixture block including a plurality of pixels, are extracted in different cycles in at least one of the column direction and the row direction. The pixels of the same color which are extracted in different cycles are mixed in each mixture block. Since the pixels of the same color to be mixed with each other are extracted in different cycles, the levels of the mixed pixels are different from each other even though the object image has a high-frequency component. It is checked whether the object image has a high-frequency component on the basis of the levels.

For example, in a color object image in which a large number of color pixels are periodically arranged in the column direction and the row direction, the same-color pixel extraction device extracts at least pixels of the same color which have the highest contribution to brightness among the pixels of the same color included in a mixture block including a plurality of color pixels in different cycles in at least one of the column direction and the row direction.

The pixel mixing device may further include: a solid-state electronic imaging device that includes a plurality of photoelectric conversion elements for obtaining the pixels forming the object image and captures the object image; a focus lens that forms the object image on a light receiving surface of the solid-state electronic imaging device; and a focus lens control device (focus lens control means) for controlling a focus position of the focus lens, on the basis of a plurality of mixed pixels of the same color obtained by mixing the pixels of the same color, which are extracted in different cycles by the first same-color pixel mixture device, in each mixture block.

The pixel mixing device may further include: a level difference determination device (level difference determination means) for determining whether there is a level difference between a plurality of pixels of the same color obtained by mixing the pixels of the same color, which are extracted in different cycles by the first same-color pixel mixture device, in each mixture block; and a noise reduction device (noise reduction means) for reducing noise in the object image when the level difference determination device determines that there is a level difference.

The pixel mixing device may further include: an imaging control device (imaging control means) for controlling the solid-state electronic imaging device such that the photoelectric conversion elements corresponding to the pixels of the same color which are extracted in different cycles by the first same-color pixel mixture device have different exposure times; and a second same-color pixel mixture device (second same-color pixel mixture means) for mixing a plurality of mixed pixels of the same color, which are obtained by mixing a plurality of pixels of the same color extracted in different cycles by the first same-color pixel mixture device in each mixture block, at a level corresponding to the exposure time in each mixture block.

For example, the first same-color pixel mixture device mixes the pixels of the same color in each mixture block such that the centers of gravity of the mixed pixels of the same color are located at the same position in each mixture block.

In a first mode, in the color object image in which a large number of color pixels are periodically arranged in the column direction and the row direction, the same-color pixel extraction device may extract first pixels of the same color which have the highest contribution to brightness among the pixels of the same color included in the mixture block including a plurality of color pixels in different cycles in at least one of the column direction and the row direction, and may extract second pixels of the same color other than the pixels of the same color which have the highest contribution to brightness. In the first mode, the first same-color pixel mixture device may mix a plurality of first pixels of the same color, which are extracted in different cycles by the same-color pixel extraction device, in each mixture block such that the centers of gravity of the mixed pixels are located at the same position in each mixture block, and may mix the second pixels of the same color in each mixture block.

For example, in a second mode, the same-color pixel extraction device extracts the outermost pixels of the same color among the pixels of the same color which are included in the mixture block. In the second mode, the first same-color pixel mixture device mixes the pixels of the same color extracted by the same-color pixel extraction device in each mixture block.

The pixel mixing device may further include: a heat amount determination device (heat amount determination means) for determining whether an amount of heat generated from the solid-state electronic imaging device is less than a threshold value; and a first control device (first control means) for controlling the same-color pixel extraction device and the first same-color pixel mixture device such that the same-color pixel extraction device and the first same-color pixel mixture device are operated in the first mode when the heat amount determination device determines that the amount of heat is less than the threshold value and that the same-color pixel extraction device and the first same-color pixel mixture device are operated in the second mode when the heat amount determination device determines that the amount of heat is equal to or greater than the threshold value.

The pixel mixing device may further include: a capacity determination device (capacity determination means) for determining whether power supply capacity of the pixel mixing device is less than a threshold value; and a first control device (first control means) for controlling the same-color pixel extraction device and the first same-color pixel mixture device such that the same-color pixel extraction device and the first same-color pixel mixture device are operated in the first mode when the capacity determination device determines that the power supply capacity is equal to or greater than the threshold value and that the same-color pixel extraction device and the first same-color pixel mixture device are operated in the second mode when the capacity determination device determines that the power supply capacity is less than the threshold value.

The pixel mixing device may further include a recording control device (recording control means) for recording data indicating the pixels which are mixed by the first same-color pixel mixture device on a recording medium. The first mode may be set when a recording command is issued and the second mode may be set when the recording command is not issued.

An imaging apparatus may include the pixel mixing device.

DESCRIPTION OF THE PREFERRED EMBODIMENTS

Figure 1:
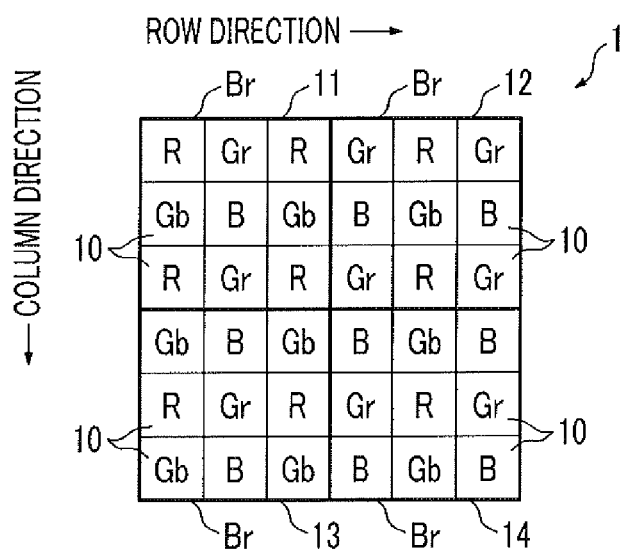
FIG. 1 illustrates an example of a partial color image.

FIG. 1 illustrates a partial color image 1 indicating a portion of a color image obtained by an imaging device in which color filters are arranged in a Bayer array on light receiving surfaces of a plurality of photodiodes.

The partial color image 1 illustrated in FIG. 1 includes six pixels 10 in a row direction (a direction in which the number of rows increases) and six pixels 10 in a column direction (a direction in which the number of columns increases). Red pixels (R pixels) that are obtained from signal charges stored in photodiodes having light receiving surfaces on which red filters with characteristics that transmit a red light component are formed are arranged in the odd-numbered columns and the odd-numbered rows. Blue pixels (B pixels) that are obtained from signal charges stored in photodiodes having light receiving surfaces on which blue filters with characteristics that transmit a blue light component are formed are arranged in the even-numbered columns and the even-numbered rows. Green pixels that are obtained from signal charges stored in photodiodes having light receiving surfaces on which green filters with characteristics that transmit a green light component are formed are arranged in the even-numbered columns and the odd-numbered rows and the odd-numbered columns and the even-numbered rows. In this embodiment, the green pixel arranged between the R pixels in the odd-numbered row is referred to as a Gr pixel and the green pixel arranged between the B pixels in the even-numbered row is referred to as a Gb pixel. In FIG. 1, the R pixels may be arranged in the odd-numbered rows and the even-numbered columns, the B pixels may be arranged in the even-numbered rows and the odd-numbered columns, and the green pixels may be arranged in the other columns and rows. The Gb pixel is present in the same row as the B pixel and the Gr pixel is present in the same column as the B pixel. In addition, the Gr pixel is present in the same row as the R pixel and the Gb pixel is present in the same column as the R pixel.

FIG. 1 illustrates the partial color image 1 based on the Bayer array. Therefore, pixels 10 are repeated in a basic array pattern of 2 pixels×2 pixels in the column direction and the row direction.

In this embodiment, a pixel mixture block Br with a size of 3 pixels×3 pixels in the column direction and the row direction is defined. In the pixel mixture block Br, the pixels of the same color are mixed and a color image is reduced to 1/9, which will be described below. However, the Gr pixel and the Gb pixel which have the highest contribution to brightness are pixels of the same color and are distinguished from each other in the pixel mixture. The Gr pixels are mixed with each other and the Gb pixels are mixed with each other in the pixel mixture. In addition, it goes without saying that the pixel mixture block Br is not limited to a size of 3 pixels×3 pixels.

Among image portions defined by four pixel mixture blocks Br with a size of 3 pixels×3 pixels forming the partial color image 1, the upper left image portion, the upper right image portion, the lower left image portion, and the lower right image portion are referred to as image portions 11, 12, 13, and 14, respectively.

FIGS. 2 to 5 illustrate the aspects of pixel mixture in the image portion 11. The centers of gravity of mixed pixels are located at the same position in each pixel mixture block Br by the mixture of the pixels of the same color.

Figure 2:
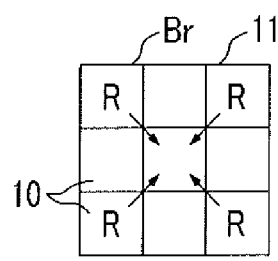
FIG. 2 illustrates pixel mixture.

FIG. 2 illustrates the mixture of R pixels forming the image portion 11. In FIG. 2, pixels other than the R pixels are not illustrated for ease of understanding.

In the image portion 11, the pixels 10 arranged at four corners are R pixels. Four R pixels at four corners are, extracted, mixed and averaged and the averaged pixel is an R mixed pixel after the image portion 11 is reduced.

Figure 3:
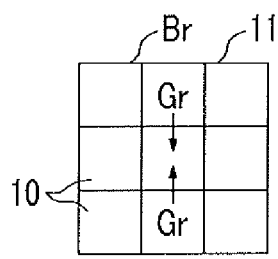
FIG. 3 illustrates pixel mixture.

FIG. 3 illustrates the mixture of Gr pixels forming the image portion 11. In FIG. 3, letters indicating the colors of pixels other than the Gr pixels are not illustrated for ease of understanding.

In the image portion 11, the Gr pixels are arranged on the upper and lower sides of the central pixel 10. The two Gr pixels are mixed and averaged and the averaged pixel is a Gr mixed pixel after the image portion 11 is reduced.

Figure 4:
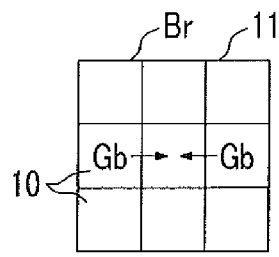
FIG. 4 illustrates pixel mixture.

FIG. 4 illustrates the mixture of Gb pixels forming the image portion 11. In FIG. 4, letters indicating the colors of pixels other than the Gb pixels are not illustrated for ease of understanding.

In the image portion 11, the Gb pixels are arranged on the left and right sides of a central pixel. The two Gb pixels are mixed and averaged and the averaged pixel is a Gb mixed pixel after the image portion 11 is reduced.

Figure 5:
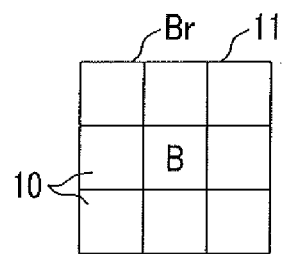
FIG. 5 illustrates pixel mixture.

FIG. 5 illustrates a B pixel forming the image portion 11. Since one central B pixel is arranged at the center in the image portion 11, the B pixel becomes a B mixed pixel after the image portion 11 is reduced.

FIGS. 6 to 9 illustrate the aspects of pixel mixture in the image portion 12. In FIGS. 6 to 9, similarly to FIGS. 2 to 5, pixels other than the pixels to be mixed are not illustrated.

Figure 6:
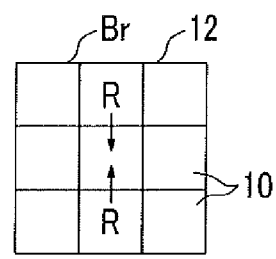
FIG. 6 illustrates pixel mixture.

FIG. 6 illustrates the mixture of R pixels in the image portion 12. Since the R pixels are arranged on the upper and lower sides of a central pixel 10, the two R pixels are mixed to generate an R mixed pixel.

Figure 7:
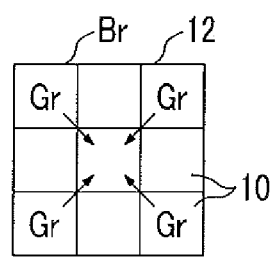
FIG. 7 illustrates pixel mixture.

FIG. 7 illustrates the mixture of Gr pixels in the image portion 12. Since the Gr pixels are arranged at four corners, the four Gr pixels are mixed to generate a Gr mixed pixel.

Figure 8:
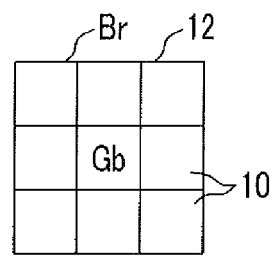
FIG. 8 illustrates pixel mixture.

FIG. 8 illustrates a Gb pixel in the image portion 12. The Gb pixel is arranged at the center and becomes a Gb mixed pixel.

Figure 9:
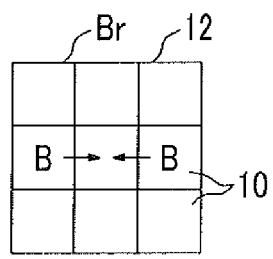
FIG. 9 illustrates pixel mixture.

FIG. 9 illustrates B pixels in the image portion 12. Since the B pixels are arranged on the left and right sides of the central pixel 10, the two B pixels are mixed to generate a B mixed pixel.

FIGS. 10 to 13 illustrate the aspects of pixel mixture in the image portion 13. In FIGS. 10 to 13, similarly to the above, pixels other than the pixels to be mixed are not illustrated.

Figure 10:
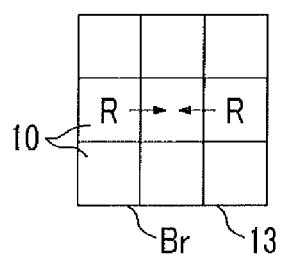
FIG. 10 illustrates pixel mixture.

FIG. 10 illustrates the mixture of R pixels in the image portion 13. The R pixels are arranged on the left and right sides of a central pixel 10 and the two R pixels are mixed to generate an R mixed pixel.

Figure 11:
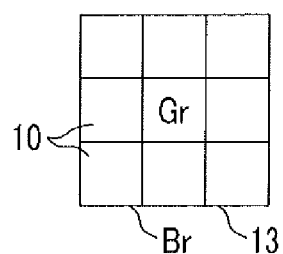
FIG. 11 illustrates pixel mixture.

FIG. 11 illustrates a Gr pixel in the image portion 13. Since the Gr pixel is arranged at the center, the Gr pixel becomes a Gr mixed pixel.

Figure 12:
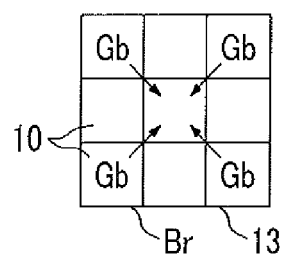
FIG. 12 illustrates pixel mixture.

FIG. 12 illustrates the mixture of Gb pixels in the image portion 13. The Gb pixels at four corners of the image portion 13 are mixed to generate a Gb mixed pixel.

Figure 13:
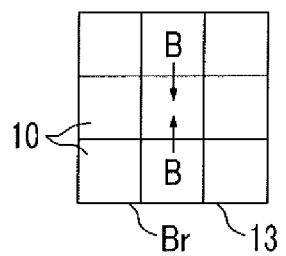
FIG. 13 illustrates pixel mixture.

FIG. 13 illustrates the mixture of B pixels in the image portion 13. The B pixels which are arranged on the upper and lower sides of the central pixel in the image portion 13 are mixed to generate a B mixed pixel.

FIGS. 14 to 17 illustrate the aspects of pixel mixture in the image portion 14. In FIGS. 14 to 17, similarly to the above, pixels other than the pixels to be mixed are not illustrated.

Figure 14:
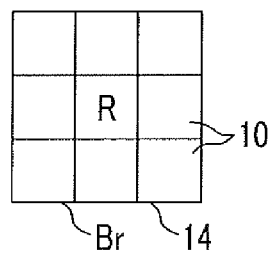
FIG. 14 illustrates pixel mixture.

FIG. 14 illustrates an R pixel in the image portion 14. Since the R pixel is arranged at the center, the R pixel becomes an R mixed pixel.

Figure 15:
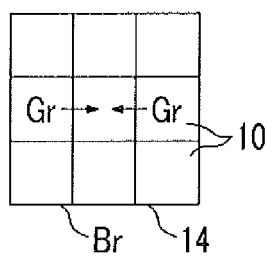
FIG. 15 illustrates pixel mixture.

FIG. 15 illustrates Gr pixels in the image portion 14. Since the Gr pixels are arranged on the left and right sides of a central pixel 10, the two Gr pixels are mixed into a Gr mixed pixel.

Figure 16:
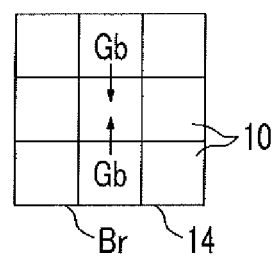
FIG. 16 illustrates pixel mixture.

FIG. 16 illustrates Gb pixels in the image portion 14. Since the Gb pixels are arranged on the upper and lower sides of the central pixel 10, the two Gb pixels are mixed into a Gb mixed pixel.

Figure 17:
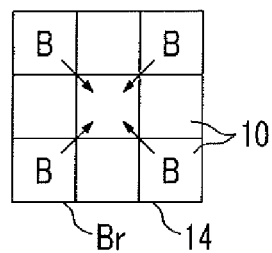
FIG. 17 illustrates pixel mixture.

FIG. 17 illustrates B pixels in the image portion 14. Since the B pixels are arranged at four corners, the four B pixels are mixed into a B mixed pixel. As such, pixel mixture is performed such that, after the pixels of each color are mixed, that is, green pixels, blue pixels, and red pixels are separately mixed, the centers of gravity of the mixed pixels of each color are located at the same pixel position in the pixel mixture block Br. Since image reduction and pixel interpolation are simultaneously performed by the pixel mixture, it is possible to omit an interpolation process (also referred to as demosaic processing) which is generally performed as a separate process, to simplify the structure of a processing circuit, and to increase a processing speed.

Figure 18:
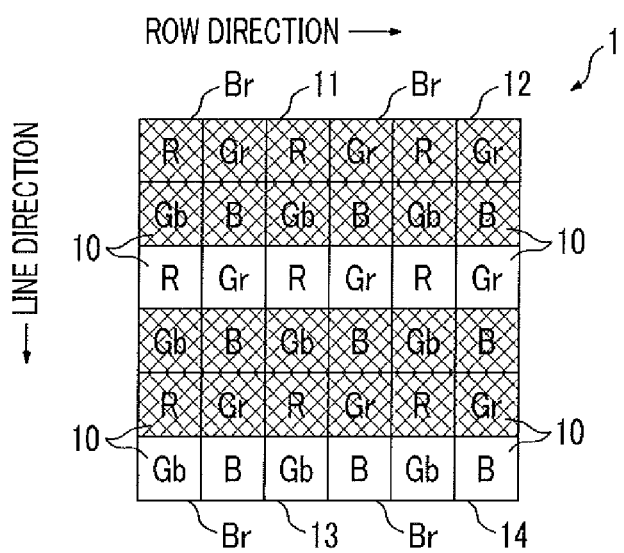
FIG. 18 illustrates an example of a partial color image.

FIG. 18 illustrates a partial color image 1 of horizontal stripes.

It is assumed that an object is white and black horizontal stripes and the cycle of white and black is shorter than the cycle of the pixel mixture block Br. For example, as illustrated in FIG. 18, it is assumed that a (3n+1)-th row and a (3n+2)-th row are black lines and a (3n+3)-th row is a white line. In the partial color image 1, a black portion is cross-hatched for ease of understanding. A portion which is not cross-hatched indicates a white portion. It is assumed that the level of the black portion is 0 and the level of the white portion is 100.

Figure 19:
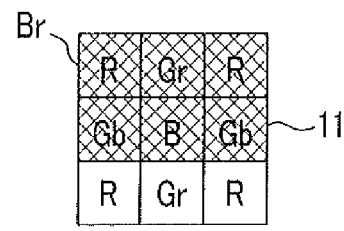
FIG. 19 illustrates an example of an image portion.

FIG. 19 illustrates an extracted image portion 11.

The black portions are present in the first and second rows and the white portion is present in the third row in the image portion 11. In the image portion 11, when pixel mixture is performed for the R pixels, the Gr pixels, the Gb pixels, and the B pixels as described above, the following process is performed.

Figure 20:
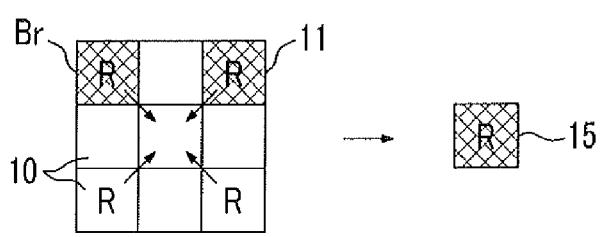
FIG. 20 illustrates pixel mixture.

FIG. 20 illustrates the mixture of the R pixels and corresponds to FIG. 2.

Since two R pixels in the first row are black and two R pixels in the third row are white, the R pixels are mixed and averaged to generate an R mixed pixel 15, as illustrated on the right side of FIG. 20. The level of the R mixed pixel 15 is 50. The R mixed pixel 15 is not cross-hatched and is simply hatched in order to indicate that the level of the R mixed pixel 15 is 50.

Figure 21:
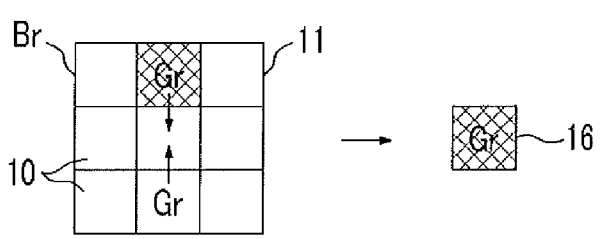
FIG. 21 illustrates pixel mixture.

FIG. 21 illustrates the mixture of the Gr pixels and corresponds to FIG. 3.

Since the Gr pixel in the first row is black and the Gr pixel in the third row is white, the Gr pixels are mixed and averaged to generate a Gr mixed pixel 16, as illustrated on the right side of FIG. 21. The level of the Gr mixed pixel 16 is 50. The Gr mixed pixel 16 is not cross-hatched and is simply hatched in order to indicate that the level of the Gr mixed pixel 16 is 50.

Figure 22:
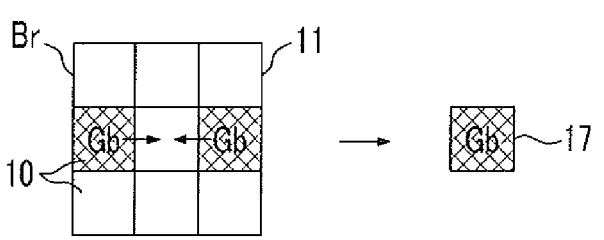
FIG. 22 illustrates pixel mixture.

FIG. 22 illustrates the mixture of the Gb pixels and corresponds to FIG. 4.

Two Gb pixels in the second row are all black and are averaged to generate a Gb mixed pixel 17, as illustrated on the right side of FIG. 22. The level of the Gb mixed pixel 17 is 0. The Gb mixed pixel is cross-hatched in order to indicate that the level of the Gb mixed pixel is 0.

Figure 23:
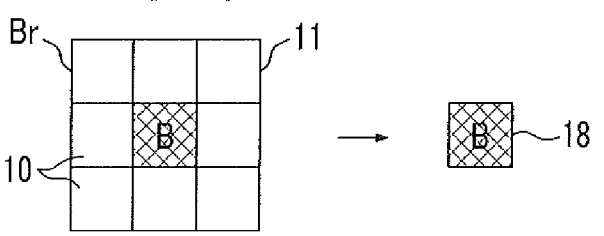
FIG. 23 illustrates pixel mixture.

FIG. 23 illustrates the mixture of the B pixel and corresponds to FIG. 5.

Since the B pixel in the second row is black, the level of the B mixed pixel is 0 as illustrated on the right side of FIG. 23. The B mixed pixel is cross-hatched in order to indicate that the level of the B mixed pixel is 0.

As can be seen from the comparison between the Gr mixed pixel 16 illustrated on the right side of FIG. 21 and the Gb mixed pixel 17 illustrated on the right side of FIG. 22, there is a difference between the level of the Gr mixed pixel 16 and the level of the Gb mixed pixel 17, which indicates that the partial color image 1 (a color image or an object image) before pixel mixture is an image with a high-frequency component (in this case, a high-frequency component in the vertical direction).

The Gr pixel and the Gb pixel are averaged to generate a mixed pixel of the green pixels. Therefore, a G mixed pixel is obtained. In this way, a reduced image including the G mixed pixels, the R mixed pixels, and the B mixed pixels is obtained. As such, in this embodiment, the pixels of the same color are extracted in different cycles in at least one of the column direction and the row direction and a plurality of pixels of the same color which are extracted in different cycles are mixed in each pixel mixture block Br.

FIGS. 20 to 23 illustrate the mixture of pixels in the image portion 11. However, similarly to the above, for image portions 12 to 14, it is determined whether the image before pixel mixture is an image with a high-frequency component, on the basis of the difference between the level of the Gr mixed pixel and the level of the Gb mixed pixel.

Figure 24:
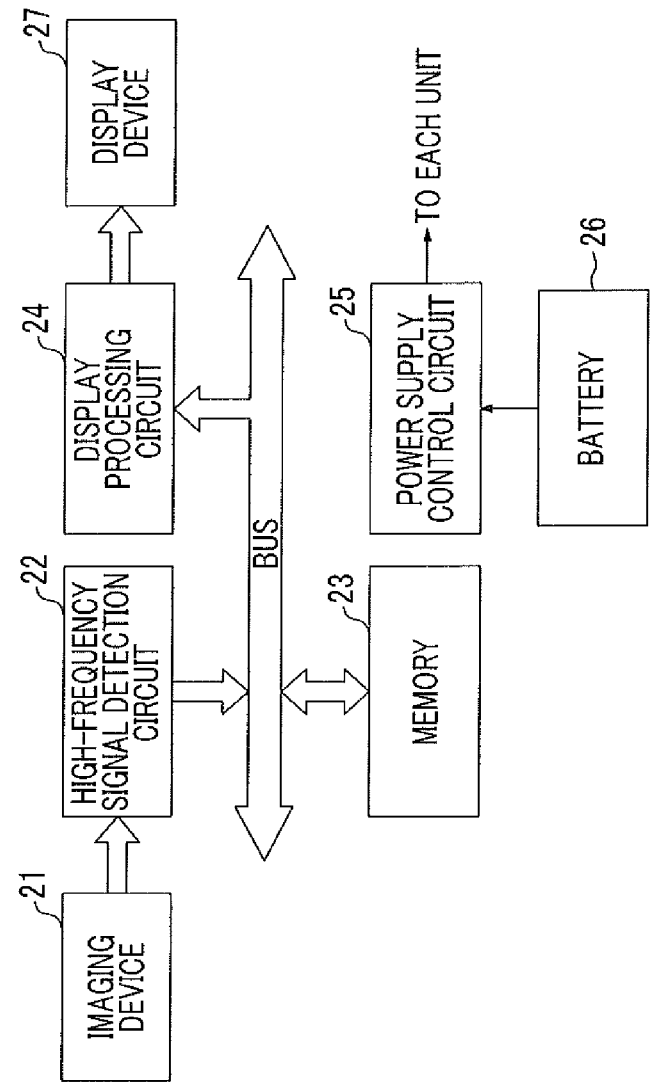
FIG. 24 is a block diagram illustrating the electrical structure of a digital camera.

FIG. 24 is a block diagram illustrating the electrical structure of a digital camera.

The digital camera is provided with a battery 26 and power is supplied from the battery 26 to each circuit of the digital camera through a power supply control circuit 25.

As described above, when an image of an object is captured by an imaging device 21 having a Bayer array, image data indicating the object image is input to a high-frequency signal detection circuit 22. As described above, the high-frequency signal detection circuit 22 generates an R mixed pixel, a Gr mixed pixel, a Gb mixed pixel, and a B mixed pixel for each pixel mixture block Br and detects whether the image data has a high-frequency component from the mixed pixels. When it is detected that the image data has a high-frequency component, the image data is used in various processes, which will be described below. In the above-mentioned example, the high-frequency signal detection circuit 22 performs pixel mixture to generate the R mixed pixel, the B mixed pixel, the Gr mixed pixel, and the Gb mixed pixel. However, the invention is not limited thereto. For example, the pixel mixture may be performed in a state in which color image data is read from the imaging device 21 or in a stage in which color image data is output from the imaging device 21. In this case, it is possible to increase a processing speed.

When the high-frequency signal detection circuit 22 generates the R mixed pixel, the Gr mixed pixel, the Gb mixed pixel, and the B mixed pixel as described above, the Gr mixed pixel and the Gb mixed pixel are mixed to generate a G mixed pixel. In this way, image data indicating a reduced image is generated. The image data indicating the reduced image is transmitted to a memory 23 and is then temporarily stored therein.

The image data indicating the reduced image is read from the memory 23 and is then transmitted to a display processing circuit 24. The display processing circuit 24 transmits the image data indicating the reduced image to a display device 27 and the reduced image is displayed on the display device 27.

Figure 25:
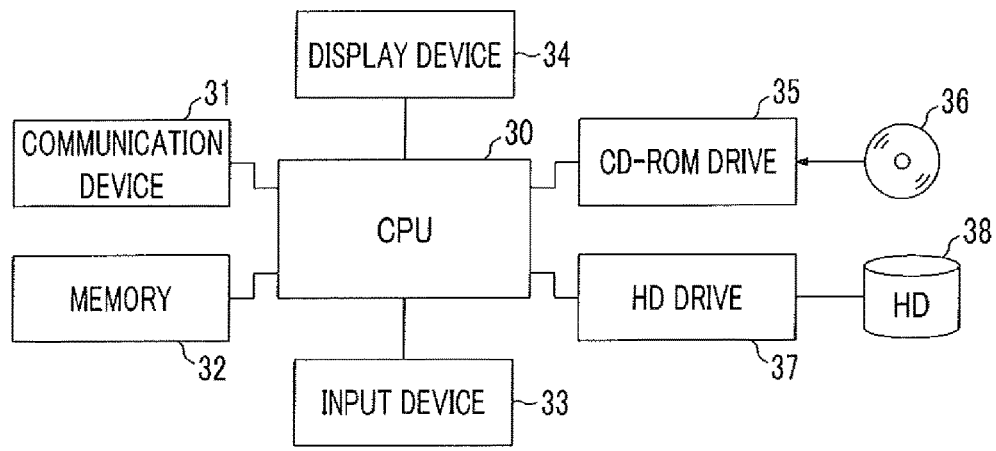
FIG. 25 is a block diagram illustrating the electrical structure of a personal computer.
Figure 26:
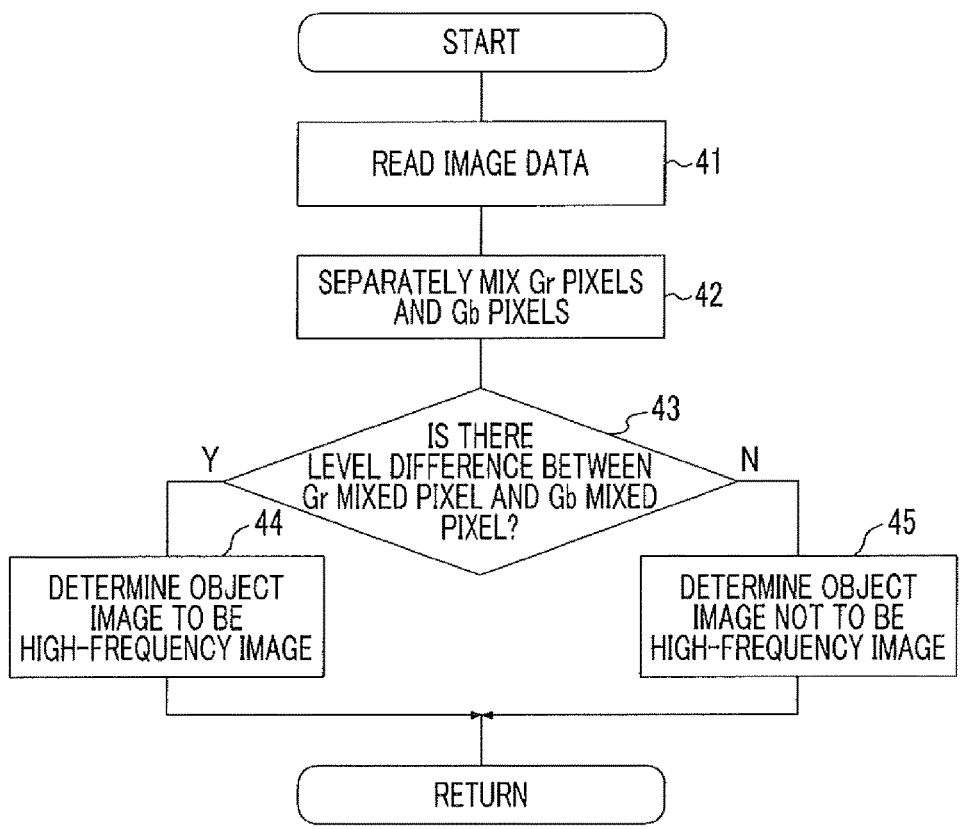
FIG. 26 is a flowchart illustrating the procedure of a process of the personal computer.

FIGS. 25 and 26 illustrate another embodiment.

FIG. 25 is a block diagram illustrating the electrical structure of a personal computer.

A CPU 30 controls the overall operation of the personal computer.

A communication device 31, a memory 32, an input device 33, such as a keyboard, and a display device 34 are connected to the CPU 30. In addition, the personal computer includes a hard disk 38, a hard disk drive 37 that accesses the hard disk 38, and a compact disk-read only memory (CD-ROM) drive 35.

A CD-ROM 36 which stores a program for performing the above-mentioned process is inserted into the CD-ROM drive 35 and the program is read from the CD-ROM 36. The read program is installed in the personal computer and the above-mentioned process is performed. The program may not be stored in the CD-ROM 36. The communication device 31 may receive the program transmitted through a network and the program may be installed in the personal computer.

FIG. 26 is a flowchart illustrating the procedure of the process of the personal computer illustrated in FIG. 25.

As described above, color image data captured by the imaging device is recorded on the hard disk 38 and the color image data is read from the hard disk 38 (Step 41).

As described above, the Gr pixels and the Gb pixels in the pixel mixture block Br are mixed (Step 42) to obtain a Gr mixed pixel and a Gb mixed pixel, respectively. Then, it is determined whether there is a level difference between the obtained Gr mixed pixel and Gb mixed pixel (Step 43).

When it is determined that there is a level difference therebetween (YES in Step 43), the object image indicated by the image data read from the hard disk 38 is determined to be a high-frequency image (Step 44). When it is determined that there is no level difference therebetween (NO in Step 43), the object image is determined not to be a high-frequency image (Step 45).

Figure 27:
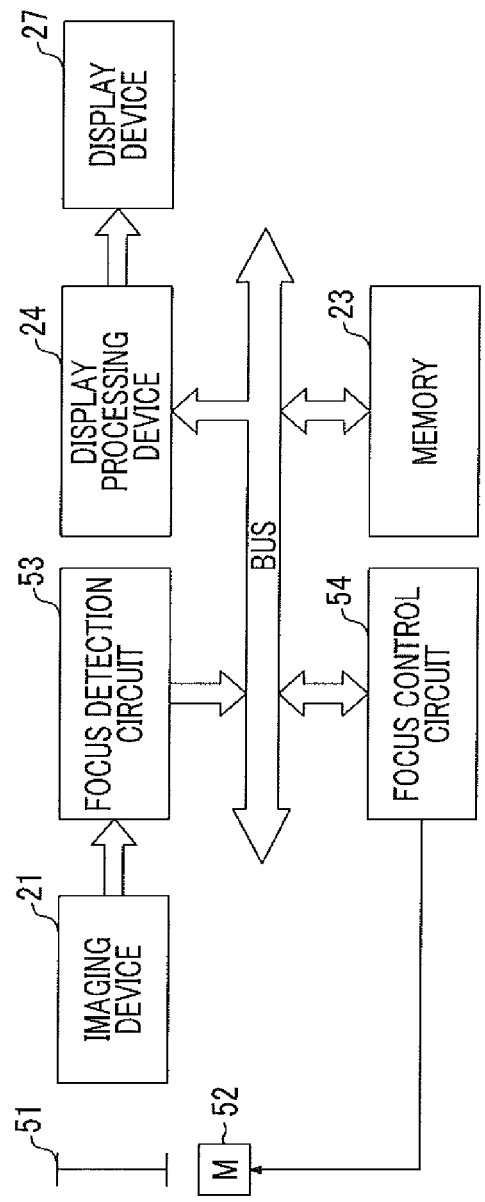
FIG. 27 is a block diagram illustrating the electrical structure of a digital camera.
Figure 28:
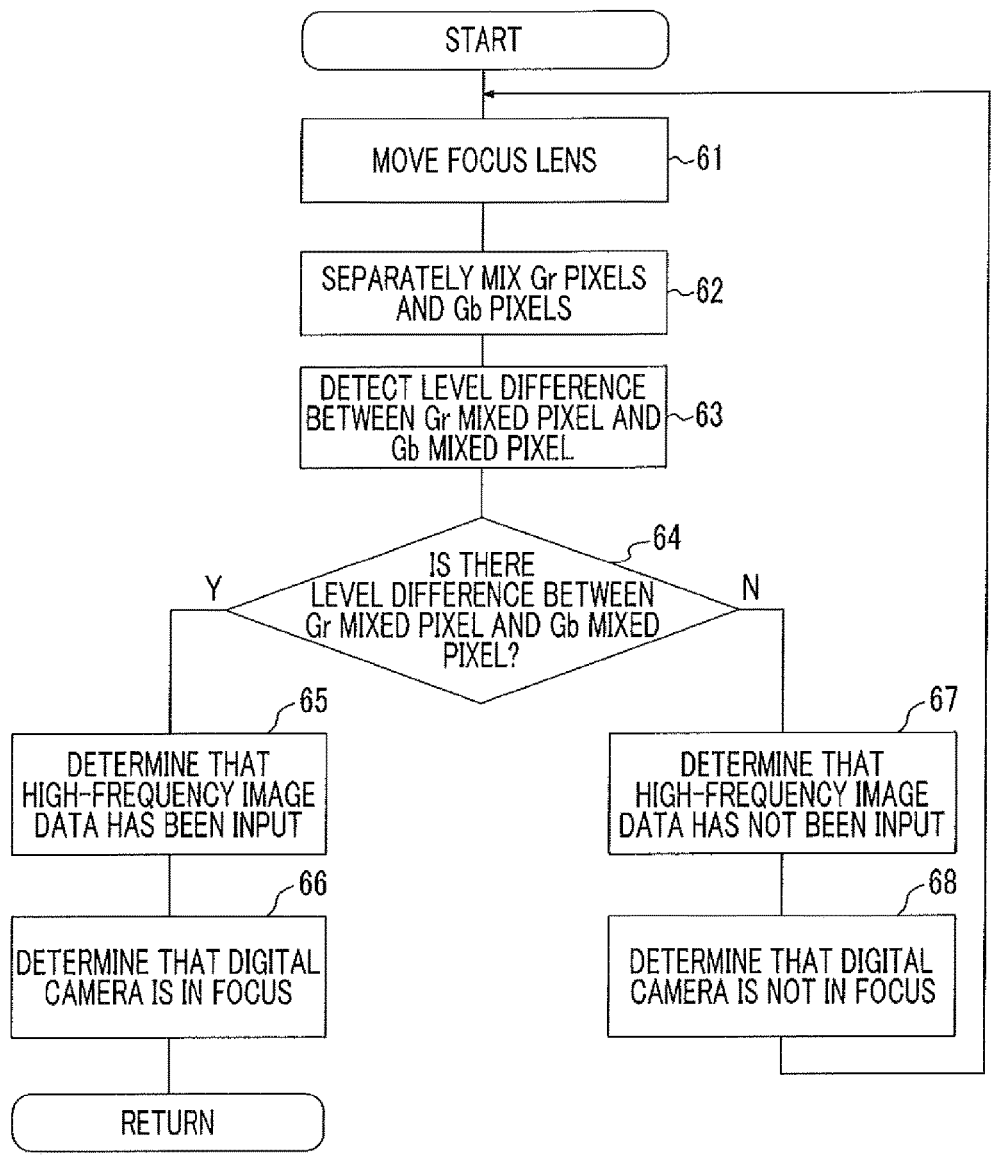
FIG. 28 is a flowchart illustrating the procedure of a process of the personal computer.

FIGS. 27 and 28 illustrate another embodiment. In this embodiment, it is determined whether a digital camera is in focus from the obtained Gr mixed pixel and Gb mixed pixel.

FIG. 27 is a block diagram illustrating the electrical structure of the digital camera. In FIG. 27, the same components as those in FIG. 24 are denoted by the same reference numerals and the description thereof will not be repeated.

A focus lens 51 which is controlled by a focus motor 52 is provided in front of an imaging device 21.

As described above, image data output from the imaging device 21 is input to a focus detection circuit 53. The focus detection circuit 53 generates an R mixed pixel, a Gr mixed pixel, a Gb mixed pixel, and a B mixed pixel as described above. The focus detection circuit 53 detects whether the digital camera is in focus, using the generated R mixed pixel, Gr mixed pixel, Gb mixed pixel, and B mixed pixel, which will be described in detail below. When the digital camera is not in focus, a focus control circuit 54 drives the focus motor 52 to position the focus lens 51. In the above-mentioned example, the focus detection circuit 53 performs pixel mixture to generate the R mixed pixel, the B mixed pixel, the Gr mixed pixel, and the Gb mixed pixel. However, the invention is not limited thereto. For example, the pixel mixture may be performed in a state in which color image data is read from the imaging device 21 or in a stage in which color image data is output from the imaging device 21. In this case, it is possible to increase a processing speed.

When the digital camera is in focus, the focus detection circuit 53 mixes the Gr mixed pixel and the Gb mixed pixel to generate a G mixed pixel. A reduced image indicated by the generated R mixed pixel, B mixed pixel, and G mixed pixel is displayed on a display device 27.

FIG. 28 is a flowchart illustrating the procedure of the process of the digital camera illustrated in FIG. 24.

The focus lens 51 is moved by the focus motor 52 (Step 61). The imaging device 21 captures an image of an object at the moved position and image data indicating the object image is input to the focus detection circuit 53. The focus detection circuit 53 mixes the Gr pixels and the Gb pixels to generate a Gr mixed pixel and a Gb mixed pixel, respectively, as described above (Step 62). A level difference between the generated Gr mixed pixel and Gb mixed pixel is detected (Step 63) and it is determined whether there is a level difference therebetween (Step 64).

When there is a level difference therebetween (YES in Step 64), it is determined that high-frequency image data has been input from the imaging device 21 to the high-frequency signal detection circuit 22 (Step 65). When the high-frequency image data is input to the high-frequency signal detection circuit 22, it is determined that the digital camera is in focus since the object image indicated by the image data is not blurred (Step 66). When there is no level difference (NO in Step 64), it is determined that the high-frequency image data has not been input to the high-frequency signal detection circuit 22 (Step 67). Since the object image indicated by the image data is considered to be blurred, it is determined that the digital camera is not in focus (Step 68). When the focus lens 51 is moved, the process is repeated again from Step 62.

Figure 29:
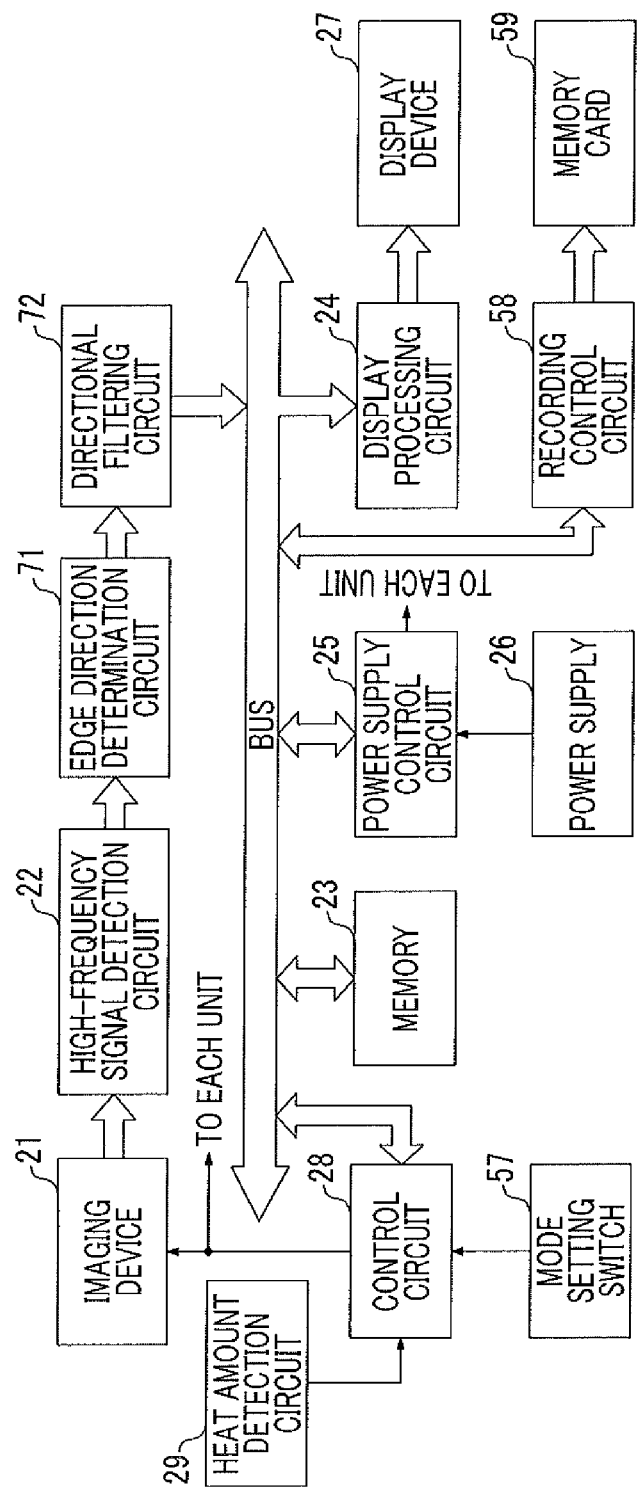
FIG. 29 is a block diagram illustrating the electrical structure of a digital camera.
Figure 30:
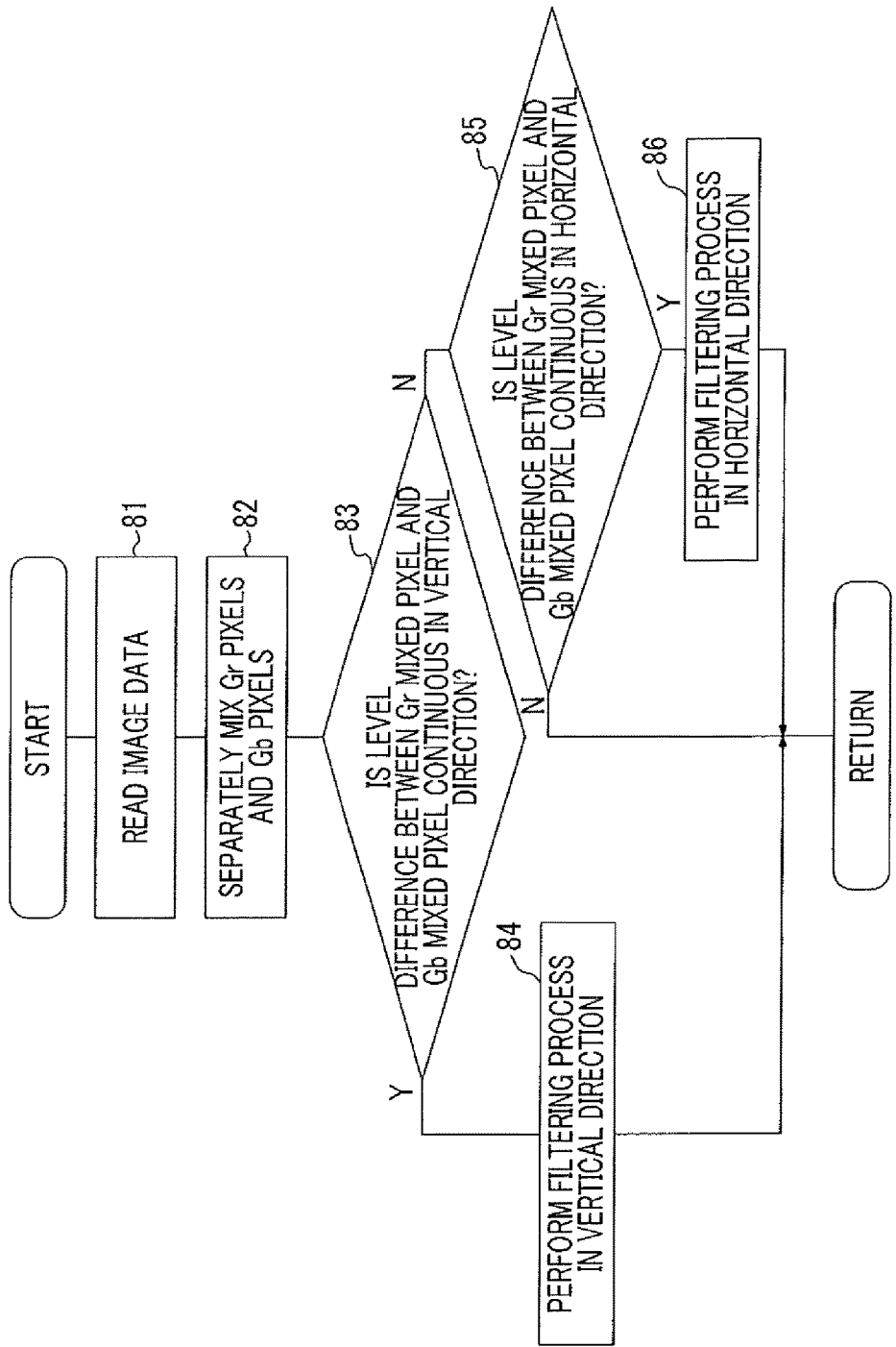
FIG. 30 is a flowchart illustrating the procedure of a process of the personal computer.

FIGS. 29 and 30 illustrate another embodiment.

FIG. 29 is a block diagram illustrating the electrical structure of a personal computer. In FIG. 29, the same components as those in, for example, FIG. 1 are denoted by the same reference numerals and the description thereof will not be repeated.

The digital camera includes a mode setting switch 57 and can set, for example, a moving image capture mode and a moving image recording mode. In the moving image capture mode, a moving image of an object is captured and displayed on a display screen of a display device 27. In the moving image recording mode, moving image data is recorded on a memory card 59.

In addition, the digital camera includes a heat amount detection circuit 29 which detects the amount of heat generated from the imaging device 21. A signal indicating the amount of heat is input to a control circuit 28. The control circuit 28 determines whether the amount of heat generated from the imaging device 21 is equal to or greater than a predetermined value.

Similarly to the structure illustrated in FIG. 24, image data output from the imaging device 21 is input to a high-frequency signal detection circuit 22 and it is detected whether the image data has a high-frequency component. When the image data has a high-frequency component, an edge direction determination circuit 71 determines the edge direction of the object image for each pixel mixture block Br. A directional filtering circuit 72 fitters the image data using a filter corresponding to the determined edge direction. In this way, it is possible to reduce noise while maintaining the edge.

When the moving image recording mode is set, the obtained image data is recorded on the memory card 59 under the control of a recording control circuit 58.

FIG. 30 is a flowchart illustrating the procedure of the process of the digital camera illustrated in FIG. 24.

The captured image data is read (Step 81) and the high-frequency signal detection circuit 22 separately mixes the Gr pixels and the Gb pixels (Step 82). It is determined whether a level difference is continuous in the vertical direction (row direction), on the basis of the values of the Gr mixed pixel and the Gb mixed pixel obtained by the pixel mixture (Step 83). When a level difference is continuous in the vertical direction (YES in Step 83), it is considered that there is an edge in the vertical direction (row direction) (the line of the edge is aligned with the horizontal direction) and a filtering process with noise reduction characteristics is performed in the vertical direction such that the edge is maintained (Step 84).

When a level difference is not continuous in the vertical direction (NO in Step 83), it is determined whether a level difference is continuous in the horizontal direction, on the basis of the value of the Gr mixed pixel and the value of the Gb mixed pixel (Step 85). When a level difference is continuous in the horizontal direction (YES in Step 85), it is considered that there is an edge in the horizontal direction (the line of the edge is aligned with the vertical direction) and a filtering process with noise reduction characteristics is performed in the horizontal direction such that the edge is maintained (Step 86).

A noise reduction process is performed while the edge is maintained.

FIGS. 31 to 34 illustrate another embodiment. In this embodiment, the exposure time of the photodiode of the imaging device for obtaining the Gr pixel and the exposure time of the photodiode of the imaging device for obtaining the Gb pixel are changed.

Figure 31:
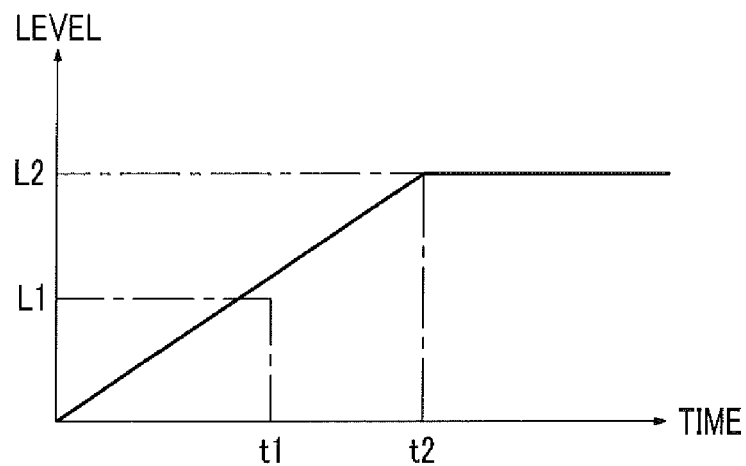
FIG. 31 illustrates the relationship between an exposure time and the level of a stored signal charge.

FIG. 31 illustrates the relationship between the photodiode of the imaging device and the level of a signal charge (the amount of signal charge) stored in the photodiode. In FIG. 31, the horizontal axis is the exposure time and the vertical axis is the level of the signal charge.

The amount of signal charge stored in the photodiode increases in proportion to the exposure time. However, the level of the signal charge is L2 at an exposure time t2 and the signal charge stored in the photodiode is saturated.

In this embodiment, the ratio of the exposure time of the photodiode for obtaining the Gr pixel to the exposure time of the photodiode for obtaining the Gb pixel is 2:1. For example, while the photodiode for obtaining the Gr pixel is exposed up to the time t2, the photodiode for obtaining the Gb pixel is exposed up to the time t1. A C-MOS imaging device may be used and the sweep time of the signal charge stored in the photodiode for obtaining the Gr pixel and the sweep time of the signal charge stored in the photodiode for obtaining the Gb pixel may be switched to easily change the exposure time.

Figure 32:
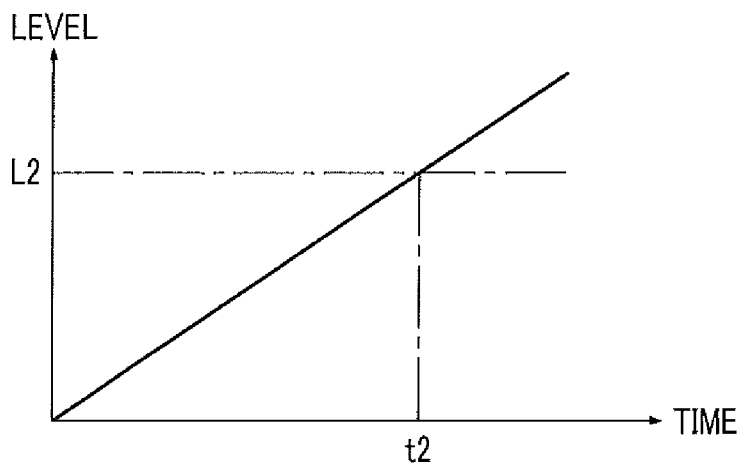
FIG. 32 illustrates the aspect of widening a dynamic range.

FIG. 32 illustrates the relationship between the level of the pixel and the exposure time indicated by the obtained signal charge.

As described above, the Gr pixel and the Gb pixel which are obtained by different exposure times are mixed to obtain image data with a wide dynamic range. For example, the Gr pixel with a long exposure time is likely to be saturated and the Gb pixel with a short exposure time is less likely to be saturated. Therefore, the Gr pixels and the Gb pixels are separately mixed such that the Gr pixel has a high percentage of low brightness components and the Gb pixel has a high percentage of high brightness components.

Figure 33:
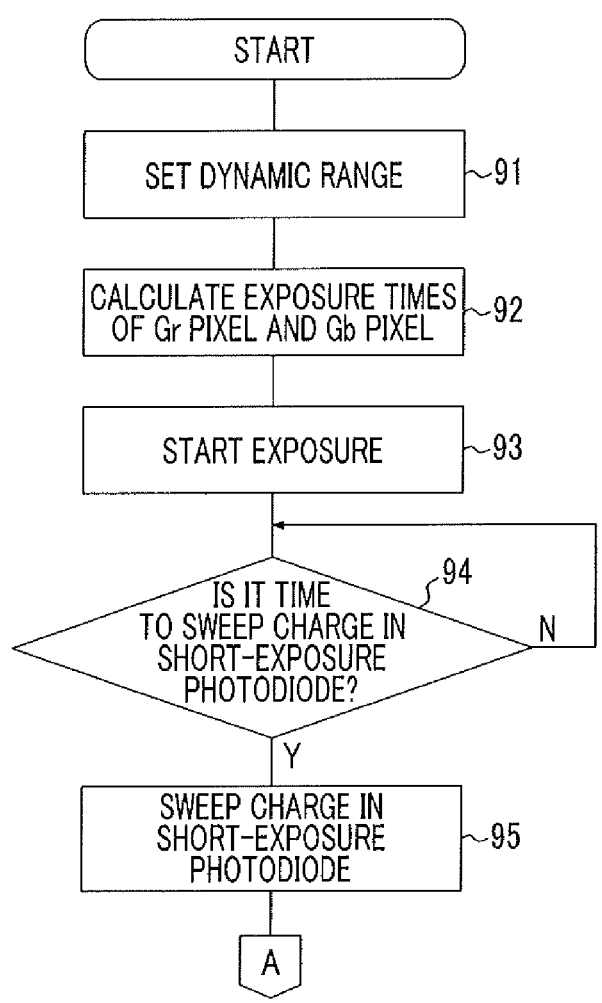
FIG. 33 is a flowchart illustrating the procedure of a process of widening the dynamic range.
Figure 34:
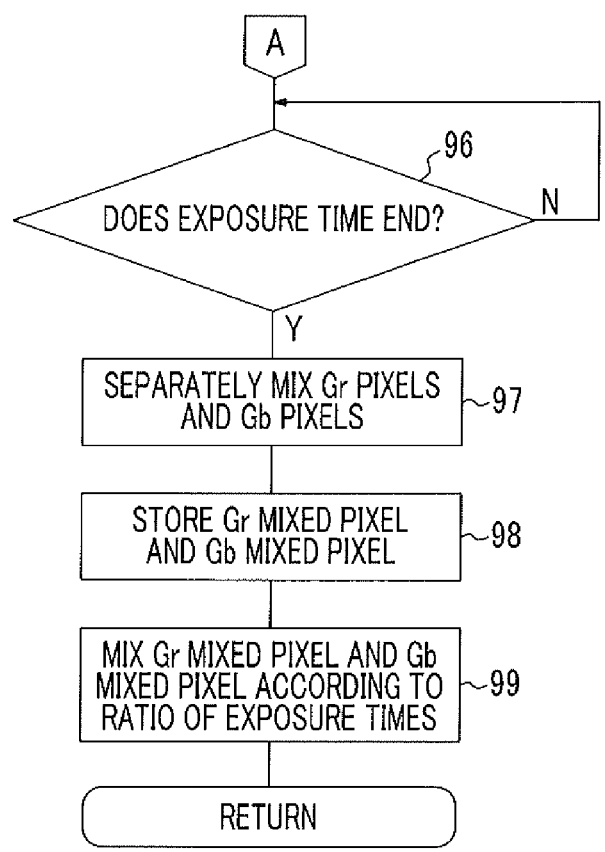
FIG. 34 is a flowchart illustrating the procedure of the process of widening the dynamic range.

FIGS. 33 and 34 are flowcharts illustrating the procedure of a process of widening the dynamic range, as described above. The digital camera illustrated in FIG. 29 can be used.

First, the digital camera is set such that a desired dynamic range is obtained (Step 91). For example, a touch panel is formed on the display screen of the display device 27 and a dynamic range setting menu is displayed on the display screen such that the dynamic range can be set. The exposure times of the Gr pixel and the Gb pixel are calculated such that the set dynamic range is obtained (Step 92).

The exposure of the imaging device 21 starts under the control of the control circuit 28 (Step 93). When it is time to sweep the signal charge of a short-exposure photodiode (YES in Step 94), the signal charge stored in the short-exposure photodiode is swept (Step 95).

When the exposure time ends (YES in Step 96), pixel mixture is separately performed for the Gr pixels and the Gb pixels, as described above (Step 97). Data indicating a Gr mixed pixel and data indicating a Gb mixed pixel are temporarily stored in the memory (Step 98) and the Gr mixed pixel and the Gb mixed pixel are mixed according to the ratio of the exposure times, as described above (Step 99). In this way, a reduced image with a wide dynamic range is obtained, as described above. For the R pixels and the B pixels other than the Gr pixels and the Gb pixels, the pixel mixture may be similarly performed for the pixels of the same color.

Figure 35:
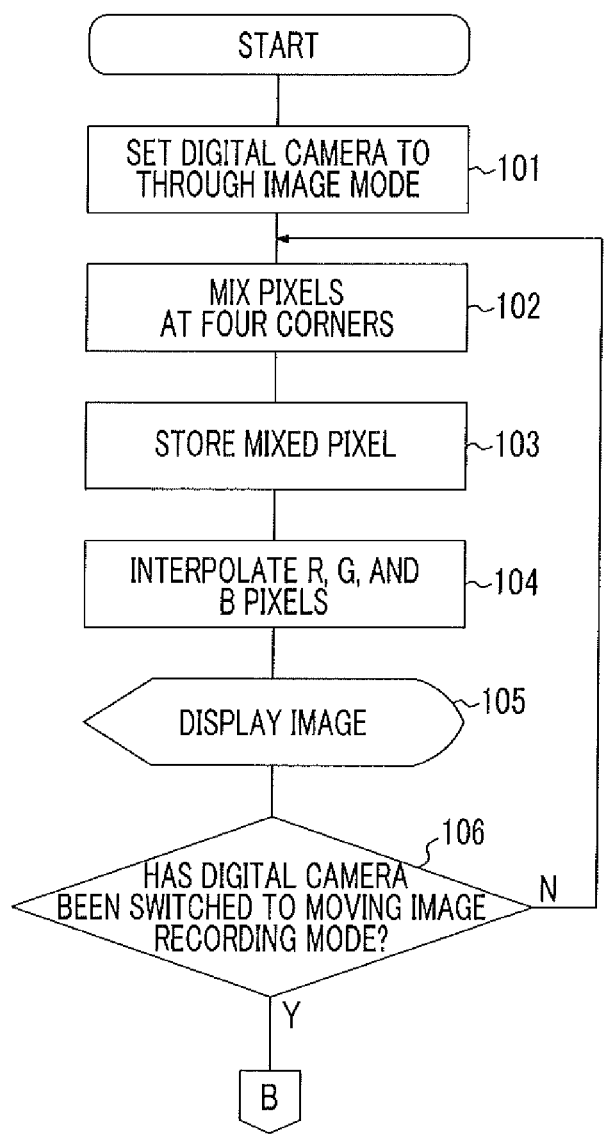
FIG. 35 is a flowchart illustrating the procedure of an interpolation process.
Figure 36:
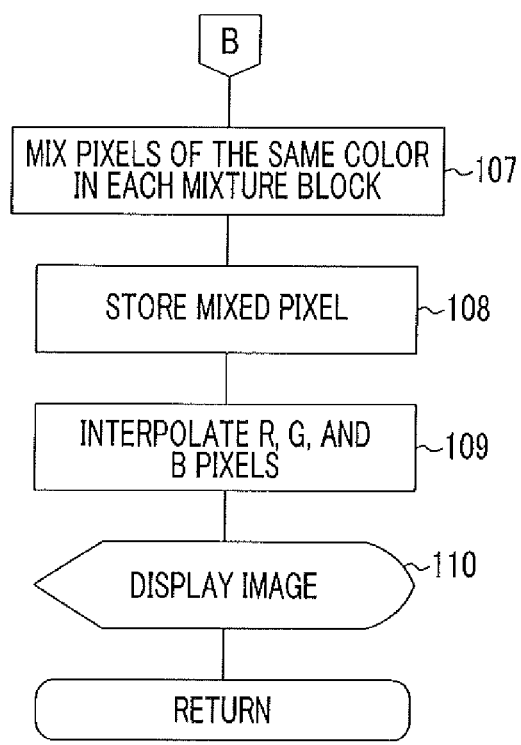
FIG. 36 is a flowchart illustrating the procedure of the interpolation process.

FIGS. 35 and 36 illustrate another embodiment and are flowcharts illustrating the procedure of the process of a digital camera.

The digital camera can record moving images. The digital camera having the same electrical structure as that illustrated in FIG. 29 can be used.

When the moving image capture mode is set by the mode setting switch 57, the digital camera is set to a through image mode (second mode) (Step 101). Then, as described above, pixels at four corners of the pixel mixture block Br are mixed (Step 102). For example, in the image portion 11 illustrated in FIG. 1, four R pixels are mixed to generate an R mixed pixel. Similarly, in the image portion 12, 13, or 14, four Gr pixels, Gb pixels, or B pixels are mixed to generate a Gr mixed pixel, a Gb mixed pixel, or a B mixed pixel. One mixed pixel is obtained from one pixel mixture block Br. Therefore, the R mixed pixels, the Gr mixed pixels, the Gb mixed pixels, or the B mixed pixels are obtained from four pixel mixture blocks Br. When each of the four mixed pixels is regarded as one pixel, the Bayer array is obtained.

The R mixed pixels, the Gr mixed pixels, the Gb mixed pixels, or the B mixed pixels obtained from four pixel mixture blocks Br are stored in the memory 23 (Step 103) and an interpolation R pixel, an interpolation G pixel, and an interpolation B pixel are generated by an interpolation process (which is also referred to as demosaic processing) (Step 104). The interpolation R pixel and the interpolation B pixel may be the R mixed pixel and the B mixed pixel, respectively. In addition, the interpolation G pixel may be an average pixel of the Gr mixed pixel and the Gb mixed pixel. A set of the interpolation R pixel, the interpolation G pixel, and the interpolation B pixel is generated for every four pixel mixture blocks. An image indicated by the generated interpolation pixels is displayed on the display screen of the display device 27 (Step 105).

When the mode is switched to the moving image recording mode (first mode) by a mode setting dial (YES in Step 106), the pixels of the same color are mixed in each pixel mixture block Br, as described above (Step 107). As described above, an R mixed pixel, a Gr mixed pixel, a Gb mixed pixel, and a B mixed pixel are obtained for each pixel mixture block Br. The obtained mixed pixels are stored in the memory 23 (Step 109) and an interpolation R pixel, an interpolation G pixel, and an interpolation B pixel are generated for each pixel mixture block Br (Step 109). An image indicated by the generated interpolation pixels is displayed on the display screen of the display device 27 (Step 110).

In a live view mode (moving image capture mode), it is possible to rapidly display an image. In a moving image mode (moving image recording mode), it is possible to prevent a reduction in resolution. In the digital camera illustrated in FIG. 24, the high-frequency signal detection circuit 22 can simply transmit the image data output from the imaging device 21 and a display processing block can perform the above-mentioned process for the image data.

Figure 37:
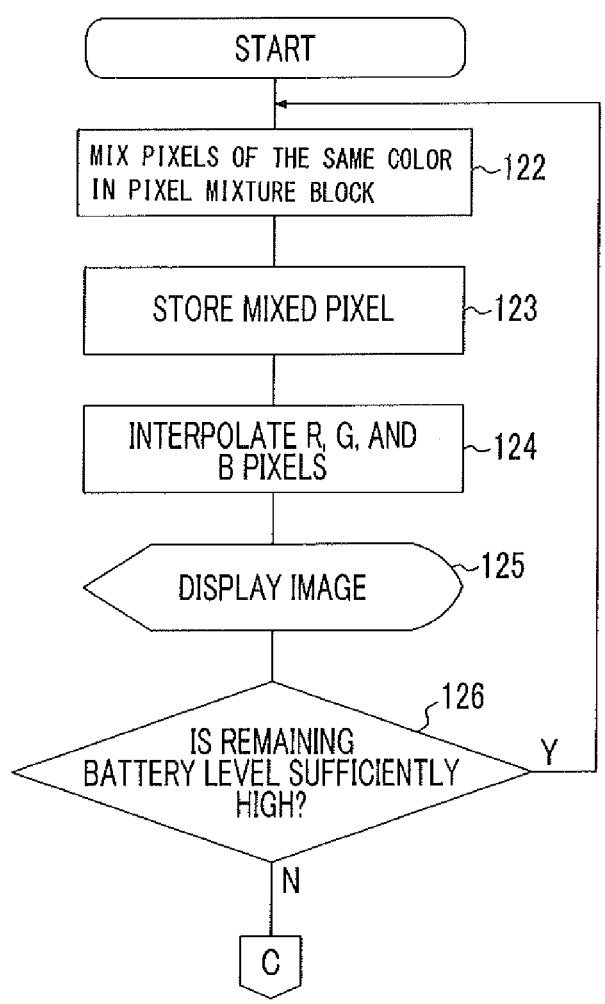
FIG. 37 is a flowchart illustrating the procedure of the interpolation process.
Figure 38:
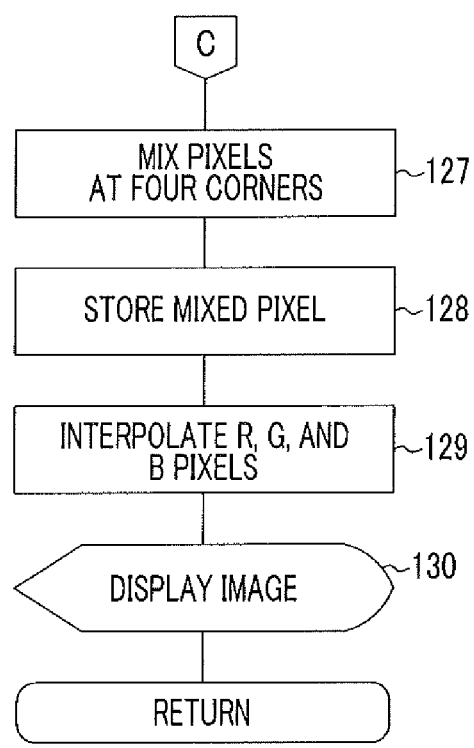
FIG. 38 is a flowchart illustrating the procedure of the interpolation process.

FIGS. 37 and 38 illustrate still another embodiment and are flowcharts illustrating the procedure of the process of a digital camera. The digital camera illustrated in FIG. 29 can be used for the procedure of the process.

First, as described above, the pixels of the same color are mixed in each pixel mixture block Br (Step 122). As described above, an R mixed pixel, a Gr mixed pixel, a Gb mixed pixel, and a B mixed pixel are obtained for each pixel mixture block Br. The obtained mixed pixels are stored in the memory 23 (Step 123) and an interpolation R pixel, an interpolation G pixel, and an interpolation B pixel are generated for each pixel mixture block Br (Step 124). An image indicated by the generated interpolation pixels is displayed on the display screen of the display device 27 (Step 125).

The control circuit 28 determines whether the remaining battery level of the power supply 26 is sufficiently high. When the remaining battery level is sufficiently high (YES in Step 126), the above-mentioned process is repeated.

When the remaining battery level is not sufficiently high (NO in Step 126), the pixels at four corners of the pixel mixture block Br are mixed, as described above (Step 127).

The R mixed pixels, the Gr mixed pixels, the Gb mixed pixels, or the B mixed pixels obtained from four pixel mixture blocks Br are stored in the memory 23 (Step 128) and an interpolation R pixel, an interpolation G pixel and an interpolation B pixel are generated (Step 129). The interpolation R pixel and the interpolation B pixel may be the R mixed pixel and the B mixed pixel, respectively. In addition, the interpolation G pixel may be an average pixel of the Gr mixed pixel and the Gb mixed pixel. A set of the interpolation R pixel, the interpolation G pixel, and the interpolation B pixel is generated for every four pixel mixture blocks. An image indicated by the generated interpolation pixels is displayed on the display screen of the display device 27 (Step 130).

When the imaging device is large, the process from Step 127 to Step 130 may be performed.

The digital camera and the personal computer have been described above as the embodiment of the imaging apparatus according to the invention. However, the structure of the imaging apparatus is not limited thereto. Other imaging apparatuses according to the embodiments of the invention may be, for example, a built-in or external PC camera and a portable terminal apparatus with an imaging function, which will be described below.

Examples of the portable terminal apparatus, which is an embodiment of the imaging device according to the invention, include a mobile phone, a smart phone, a personal digital assistant (PDA), and a portable game machine. Hereinafter, the smart phone will be described in detail as an example with reference to the drawings.

Figure 39:
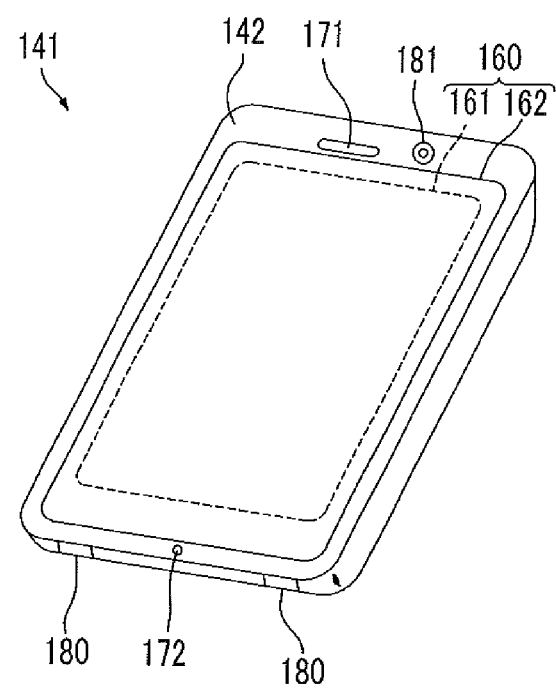
FIG. 39 illustrates the outward appearance of a smart phone.

FIG. 39 illustrates the outward appearance of a smart phone 141 which is an embodiment of the imaging apparatus according to the invention. The smart phone 141 illustrated in FIG. 39 includes a housing 142 with a flat plate shape and a display input unit 160 having a display panel 161 as a display unit and an operation panel 162 as an input unit which are integrally formed on one surface of the housing 142. The housing 142 includes a microphone 172, a speaker 171, an operating unit 180, and a camera unit 181. However, the structure of the housing 142 is not limited thereto. For example, the display unit and the input unit may be independently provided or the housing 142 may have a folding structure or a sliding mechanism.

Figure 40:
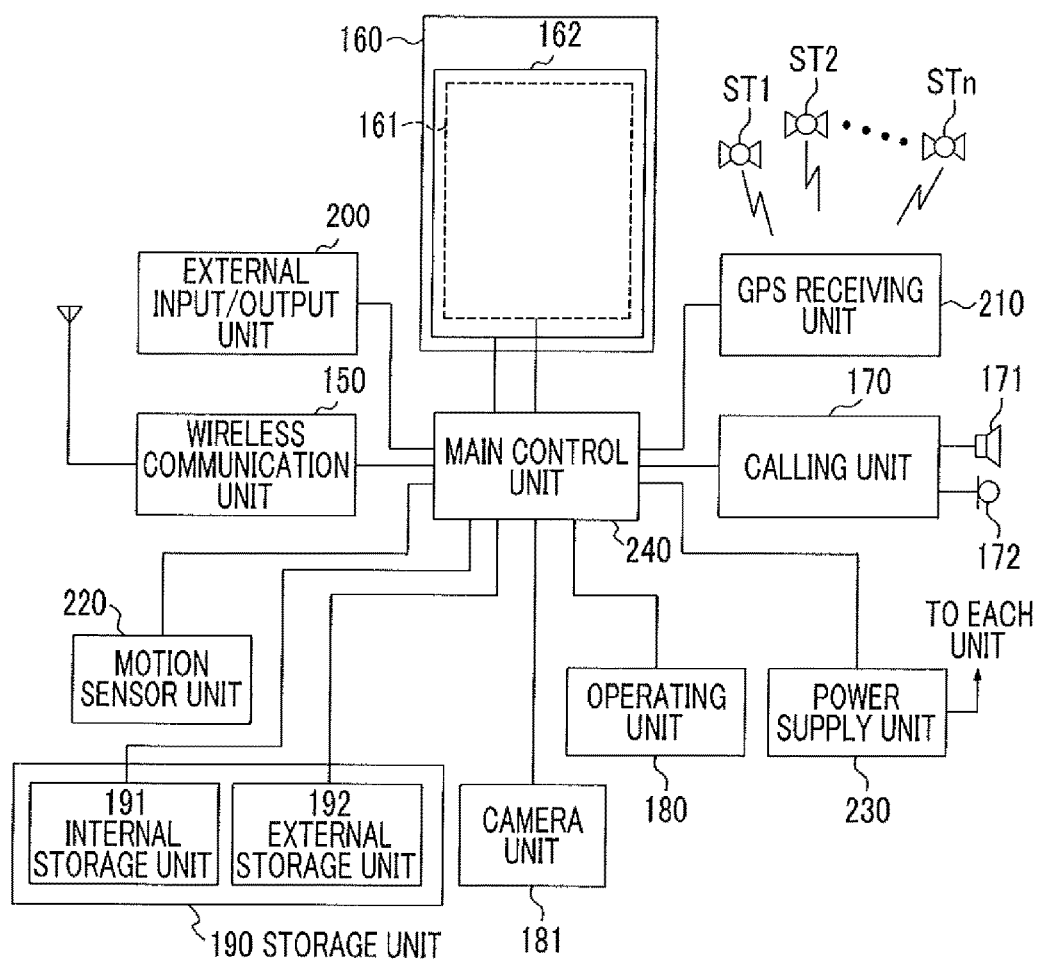
FIG. 40 is a block diagram illustrating the electrical structure of the smart phone.

FIG. 40 is a block diagram illustrating the structure of the smart phone 141 illustrated in FIG. 39. As illustrated in FIG. 40, the smart phone includes, as main components, a wireless communication unit 150, the display input unit 160, a calling unit 170, the operating unit 180, the camera unit 181, a storage unit 190, an external input/output unit 200, a global positioning system (GPS) receiving unit 210, a motion sensor unit 220, a power supply unit 230, and a main control unit 240. The smart phone 141 has, as a main function, a wireless communication function which performs mobile wireless communication through a base station apparatus BS and a mobile communication network NW.

The wireless communication unit 150 performs wireless communication with the base station apparatus BS which is accommodated in the mobile communication network NW in response to an instruction from the main control unit 240. The wireless communication is used to transmit and receive various types of file data, such as voice data and image data, and electronic mail data or to receive, for example, web data and streaming data.

The display input unit 160 is a so-called touch panel which displays, for example, images (still images and moving images) or text information to visually transmit information to the user and detects a user operation for the displayed information, under the control of the main control unit 240, and includes the display panel 161 and the operation panel 162.

The display panel 161 uses, for example, a liquid crystal display (LCD) or an organic electro-luminescence display (OELD) as a display device. The operation panel 162 is a device that is provided such that an image displayed on a display surface of the display panel 161 is visually recognized and detects one or a plurality of coordinates operated by a finger of the user or a stylus. When the device is operated by a finger of the user or a stylus, a detection signal which is generated by the operation is output to the main control unit 240. Then, the main control unit 240 detects an operation position (coordinates) on the display panel 161 on the basis of the received detection signal.

As illustrated in FIG. 39, the display panel 161 and the operation panel 162 of the smart phone 141, which is an embodiment of the imaging apparatus according to the invention, are integrated to form the display input unit 160 and the operation panel 162 is arranged so as to completely cover the display panel 161. When this arrangement is used, the operation panel 162 may have a function of detecting the user's operation even in a region other than the display panel 161. In other words, the operation panel 162 may include a detection region (hereinafter, referred to as a display region) for an overlap portion which overlaps the display panel 161 and a detection region (hereinafter, referred to as a non-display region) for the other outer edge portion which does not overlap the display panel 161.

The size of the display region may be exactly equal to the size of the display panel 161. However, the sizes are not necessarily equal to each other. The operation panel 162 may include two sensitive regions, that is, an outer edge portion and an inner portion other than the outer edge portion. The width of the outer edge portion is appropriately designed according to, for example, the size of the housing 142. Examples of a position detecting method which is used in the operation panel 162 include a matrix switching method, a resistive film method, a surface elastic wave method, an infrared method, an electromagnetic induction method, and a capacitive sensing method. Any method may be used.

The calling unit 170 includes the speaker 171 and the microphone 172. The calling unit 170 converts the voice of the user which is input through the microphone 172 into voice data which can be processed by the main control unit 240 and outputs the converted voice data to the main control unit 240. In addition, the calling unit 170 decodes voice data received by the wireless communication unit 150 or the external input/output unit 200 and outputs the decoded voice data from the speaker 171. As illustrated in FIG. 39, for example, the speaker 171 can be mounted on the same surface as the display input unit 160 and the microphone 172 can be mounted on a side surface of the housing 142.

The operating unit 180 is a hardware key which uses, for example, a key switch and receives instructions from the user. For example, as illustrated in FIG. 39, the operating unit 180 is a push button switch which is mounted on the side surface of the housing 142 of the smart phone 141, is turned on when it is pressed by, for example, a finger, and is turned off by the restoring force of a spring when the finger is taken off.

The storage unit 190 stores a control program or control data of the main control unit 240, application software, address data which is associated with, for example, the names or phone numbers of communication partners, transmitted and received electronic mail data, web data which is downloaded by web browsing, or downloaded content data. In addition, the storage unit 190 temporarily stores, for example, streaming data. The storage unit 190 includes an internal storage unit 191 which is provided in the smart phone and an external storage unit 192 which has a detachable external memory slot. The internal storage unit 191 and the external storage unit 192 forming the storage unit 190 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 200 functions as an interface with all external apparatuses which are connected to the smart phone 141 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB (registered trademark)) network, or a ZigBee (registered trademark) network).

Examples of the external apparatus connected to the smart phone 141 include a wired/wireless headset, a wired/wireless external charger, a wired/wireless data port, and a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit can transmit data which is received from the external apparatus to each component of the smart phone 141 or can transmit data in the smart phone 141 to the external apparatus.

The GPS receiving unit 210 receives GPS signals transmitted from GPS satellites ST1 to STn and performs a position measurement process on the basis of the plurality of received GPS signals to detect a position including the latitude, longitude, and height of the smart phone 141, in response to an instruction from the main control unit 240. When the GPS receiving unit 210 can acquire positional information from the wireless communication unit 150 or the external input/output unit 200 (for example, the wireless LAN), it can detect the position using the positional information.

The motion sensor unit 220 includes, for example, a triaxial acceleration sensor and detects the physical movement of the smart phone 141 in response to an instruction from the main control unit 240. The moving direction or acceleration of the smart phone 141 is detected by the detected physical movement of the smart phone 141. The detection result is output to the main control unit 240.

The power supply unit 230 supplies power which is stored in a battery (not illustrated) to each unit of the smart phone 141 in response to an instruction from the main control unit 240.

The main control unit 240 includes a microprocessor, operates on the basis of the control program or control data stored in the storage unit 190, and controls the overall operation of each unit of the smart phone 141. The main control unit 240 has an application processing function and a mobile communication control function of controlling each unit of a communication system in order to perform voice communication or data communication through the wireless communication unit 150.

The application processing function is implemented by the operation of the main control unit 240 based on the application software which is stored in the storage unit 190. Examples of the application processing function include an infrared communication function which controls the external input/output unit 200 such that data communication with an opposing apparatus is performed, an electronic mail function which transmits and receives electronic mail, and a web browsing function which browses web pages.

The main control unit 240 has, for example, an image processing function which displays an image on the display input unit 160 on the basis of image data (still image or moving image data) such as received data or downloaded streaming data. The image processing function means the function of the main control unit 240 decoding the image data, performing image processing on the decoding result, and displaying the image on the display input unit 160.

The main control unit 240 performs display control for the display panel 161 and operation detection control which detects the operation of the user through the operating unit 180 and the operation panel 162.

The main control unit 240 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 161.

The main control unit 240 performs the operation detection control to detect the operation of the user input through the operating unit 180, to receive an operation for the icon or the input of a character string to an input field of the window through the operation panel 162, or to receive a request to scroll the displayed image through the scroll bar.

In addition, the main control unit 240 performs the operation detection control to determine whether the position of an operation for the operation panel 162 is an overlap portion (display region) which overlaps the display panel 161 or an outer edge portion (non-display region) which does not overlap the display panel 161 other than the overlap portion. The main control unit 240 has a touch panel control function which controls a sensitive region of the operation panel 162 or the display position of the software key.

The main control unit 240 can detect a gesture operation for the operation panel 162 and perform a predetermined function according to the detected gesture operation. The gesture operation does not mean a simple touch operation of the related art, but means an operation which draws a trace using a finger, an operation which designates a plurality of positions at the same time, or a combination thereof which draws a trace for at least one of the plurality of positions.

The camera unit 181 is a digital camera which electronically captures an image using an imaging element, such as a complementary metal oxide semiconductor (CMOS) image sensor or a charge-coupled device (CCD). The camera unit 181 converts captured image data into image data which is compressed in, for example, a joint photographic coding experts group (PEG) format under the control of the main control unit 240 and stores the converted image data in the storage unit 190 or outputs the converted image data through the external input/output unit 200 or the wireless communication unit 150. As illustrated in FIG. 39, the camera unit 181 is mounted on the same surface as the display input unit 160 in the smart phone 141. However, the mounting position of the camera unit 181 is not limited thereto. For example, the camera unit 181 may be mounted on the rear surface of the display input unit 160 or a plurality of camera units 181 may be mounted. When the plurality of camera units 181 are mounted, the camera units 181 which are used to capture images may be switched such that a single camera unit captures images or the plurality of camera units 181 may be simultaneously used to capture images.

The camera unit 181 can be used for various functions of the smart phone 141. For example, the image captured by the camera unit 181 can be displayed on the display panel 161 or the image captured by the camera unit 181 can be used as one of the operation inputs of the operation panel 162. When the GPS receiving unit 210 detects the position, the position may be detected with reference to the image from the camera unit 181. In addition, the optical axis direction of the camera unit 181 in the smart phone 141 may be determined or the current usage environment may be determined, with reference to the image from the camera unit 181, using the triaxial acceleration sensor or without using the triaxial acceleration sensor. Of course, the image from the camera unit 181 may be used in the application software.

For example, various kinds of information, such as the positional information which is acquired by the GPS receiving unit 210, the voice information which is acquired by the microphone 172 (for example, the main control unit may convert the voice information into text information using voice-text conversion), and the posture information acquired by the motion sensor unit 220, may be added to the image data of a still image or a moving image and the image data may be stored in the storage unit 190 or may be output through the external input/output unit 200 or the wireless communication unit 150.

In the above-described embodiment, the centers of gravity of the mixed pixels are located at the same position in the pixel mixture block Br.

What is claimed is:

1. A pixel mixing device comprising:
   processing circuitry configured to:
   extract pixels of the same color, which are included in a mixture block including a plurality of pixels in an odd number of rows and a plurality of pixels in an odd number of columns, in processing a single object image in which a large number of pixels are arranged in a column direction and a row direction;
   mix the pixels of the same color in an odd numbered row or an even numbered row and the pixels of the same color separately by the processing circuitry, in each mixture block;
   and determine a high frequency component in the single object image before pixel mixture based on a difference between the level of the first pixel that is to be mixed with pixels of the same color in the odd numbered row and the level of the second pixel that is to be mixed with pixels of the same color in the even numbered row.

2. The pixel mixing device according to claim 1, wherein, in a color object image in which a large number of color pixels are periodically arranged in the column direction and the row direction, the processing circuitry extracts at least pixels of the same color which have the highest contribution to brightness among the pixels of the same color included in a mixture block including a plurality of color pixels in different cycles in at least one of the column direction and the row direction.

3. The pixel mixing device according to claim 1, further comprising:
   a solid-state electronic imaging device that includes a plurality of photoelectric conversion elements for obtaining the pixels forming the object image and captures the object image; and
   a focus lens that forms the object image on a light receiving surface of the solid-state electronic imaging device;
   wherein the processing circuitry is further configured to control a focus position of the focus lens, on the basis of a plurality of mixed pixels of the same color obtained by mixing the pixels of the same color, which are extracted in different cycles by the processing circuitry, in each mixture block.

4. The pixel mixing device according to claim 1, the processing circuitry further configured to:
   determine whether there is a level difference between a plurality of pixels of the same color obtained by mixing the pixels of the same color, which are extracted in different cycles by the processing circuitry, in each mixture block; and
   reduce noise in the object image when it is determined that there is a level difference.

5. The pixel mixing device according to claim 3, wherein the processing circuitry is further configured to:
   control the solid-state electronic imaging device such that the photoelectric conversion elements corresponding to the pixels of the same color which are extracted in different cycles by the processing circuitry have different exposure times; and
   mix a plurality of mixed pixels of the same color, which are obtained by mixing a plurality of pixels of the same color extracted in different cycles by the processing circuitry in each mixture block, at a level corresponding to the exposure time in each mixture block.

6. The pixel mixing device according to claim 1, wherein the processing circuitry mixes the pixels of the same color in each mixture block such that the centers of gravity of the mixed pixels of the same color are located at the same position in each mixture block.

7. The pixel mixing device according to claim 1, wherein, in a first mode, in the color object image in which a large number of color pixels are periodically arranged in the column direction and the row direction, the processing circuitry extracts first pixels of the same color which have the highest contribution to brightness among the pixels of the same color included in the mixture block including a plurality of color pixels in different cycles in at least one of the column direction and the row direction, and extracts second pixels of the same color other than the pixels of the same color which have the highest contribution to brightness, and in the first mode, the processing circuitry mixes a plurality of first pixels of the same color, which are extracted in different cycles by the processing circuitry, in each mixture block such that the centers of gravity of the mixed pixels are located at the same position in each mixture block, and mixes the second pixels of the same color in each mixture block.

8. The pixel mixing device according to claim 7,
wherein, in a second mode, the processing circuitry extracts the outermost pixels of the same color among the pixels of the same color which are included in the mixture block, and in the second mode, the processing circuitry mixes the pixels of the same color extracted by the processing circuitry in each mixture block.

9. The pixel mixing device according to claim 8, wherein the processing circuitry is further configured to:
determine whether an amount of heat generated from the solid-state electronic imaging device is less than a threshold value; and
operate in the first mode when it is determined that the amount of heat is less than the threshold value and operate in the second mode when it is determined that the amount of heat is equal to or greater than the threshold value.

10. The pixel mixing device according to claim 8, wherein the processing circuitry is further configured to:
determine whether power supply capacity of the pixel mixing device is less than a threshold value; and
operate in the first mode when it is determined that the power supply capacity is equal to or greater than the threshold value and operate in the second mode when it is determined that the power supply capacity is less than the threshold value.

11. The pixel mixing device according to claim 8, the processing circuitry further configured to:
record data indicating the pixels which are mixed by the processing circuitry on a recording medium,
wherein the first mode is set when a recording command is issued and the second mode is set when the recording command is not issued.

12. An imaging apparatus comprising:
the pixel mixing device according to claim 1.

13. The pixel mixing device according to claim 1, wherein
the object image is imaged by a color imaging device in which a basic array pattern of even-pixel×even-pixel in the column direction and the row direction is repeated;
the size of the pixel mixture block is larger than the size of the basic array pattern; and
the pixel mixture block has odd-pixel×odd-pixel in the column direction and the row direction.

14. The pixel mixing device according to claim 13, wherein
the basic array pattern has 2 pixels×2 pixels in the column direction and the row direction; and
the pixel mixture block has 3 pixels×3 pixels in the column direction and the row direction.

15. A method for controlling an operation of a pixel mixing device, comprising:
a processing circuitry to extract pixels of the same color, which are included in a mixture block including a plurality of pixels in an odd number of rows and a plurality of pixels in an odd number of columns in processing a single object image in which a large number of pixels are arranged in a column direction and a row direction;
the processing circuitry to mix the pixels of the same color in an odd numbered row or an even numbered row and the pixels of the same color separately by the processing circuitry in each mixture block;
and determine a high frequency component in the single object image before pixel mixture based on a difference between the level of the first pixel that is to be mixed with pixels of the same color in the odd numbered row and the level of the second pixel that is to be mixed with pixels of the same color in the even numbered row.

16. A non-transitory recording medium storing a computer-readable program that controls a computer of a pixel mixing device so as to perform:
mixture block including a plurality of pixels in an odd number of rows and a plurality of pixels in an odd number of columns in processing a single object image in which a large number of pixels are arranged in a column direction and a row direction;
mixing the pixels of the same color in an odd numbered row or an even numbered row and the pixels of the same color separately in each mixture block;
and determine a high frequency component in the single object image before pixel mixture based on a difference between the level of the first pixel that is to be mixed with pixels of the same color in the odd numbered row and the level of the second pixel that is to be mixed with pixels of the same color in the even numbered row.

* * * * *